United States Patent [19]

Netravali

[11] 4,430,670

[45] Feb. 7, 1984

[54] RECONSTRUCTION OF QUANTIZED DPCM OR PCM SIGNALS

[75] Inventor: Arun N. Netravali, Westfield, N.J.

[73] Assignee: Bell Telephone Laboratories, Incorporated, Murray Hill, N.J.

[21] Appl. No.: 357,405

[22] Filed: Mar. 12, 1982

[51] Int. Cl.³ .............................................. H04N 7/12
[52] U.S. Cl. ...................................... 358/135; 375/26
[58] Field of Search .................. 358/135, 136; 375/26, 375/28, 30, 31, 27

[56] References Cited

U.S. PATENT DOCUMENTS 3,824,590  7/1974  Limb .................................... 358/135

OTHER PUBLICATIONS

Jayant-Adaptive Post Filtering of ADPCM Speech-Bell Syst. Tech. J.-vol. 60-No. 5-May, Jun. 1981-pp. 707-717.
Gibson et al.-Sequentially Adaptive Prediction and Coding of Speech Signals, IEEE Trans. Comm., vol. COM.-22-No. 11-Nov. 1974-pp. 1789-1797.
Gibson-Sequential Filtering of Quantization Noise in Differential Encoding Systems-Proc. of IEEE-Inter. Conf. on Cybernetics & Society-Nov. 1976-pp. 685-689.

Primary Examiner—Joseph A. Orsino, Jr.
Attorney, Agent, or Firm—Barry H. Freedman

[57] ABSTRACT

DPCM or PCM samples which have been quantized at a transmitter are assigned a representative value associated with one of a plurality of mutually exclusive quantization levels, each having predefined upper and lower limits. The sample values are reconstructed at the receiver using (in addition to the representative value) information regarding the quantizer characteristics as well as information derived from spatially or temporally correlated samples. In DPCM systems, the same technique can also be used at the transmitter to improve prediction of the present sample by improving reconstruction of previously processed samples.

28 Claims, 3 Drawing Figures

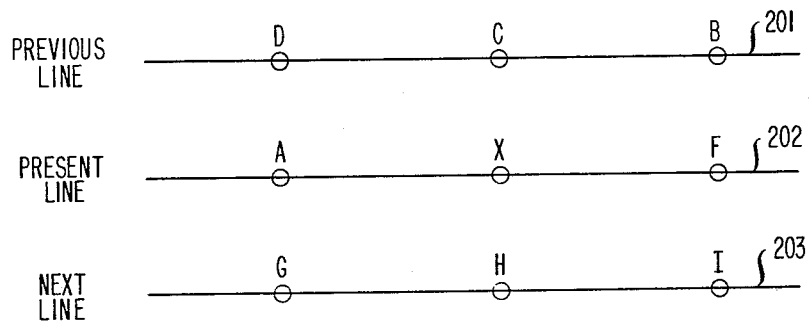
FIG. 2
SAMPLE CONFIGURATION
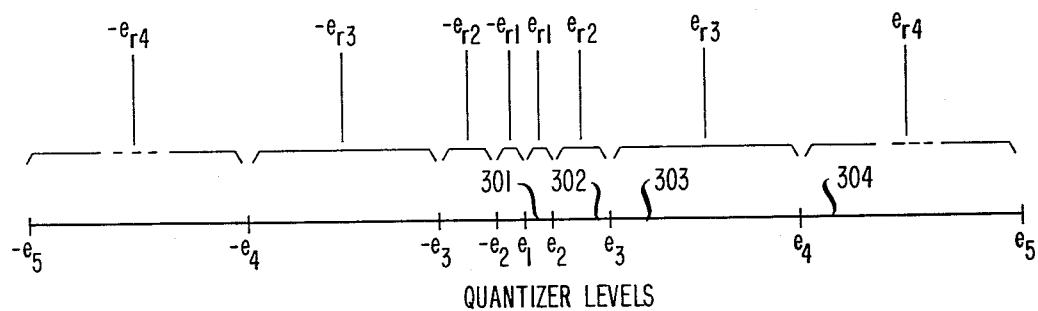
FIG. 3
REPRESENTATIVE LEVELS
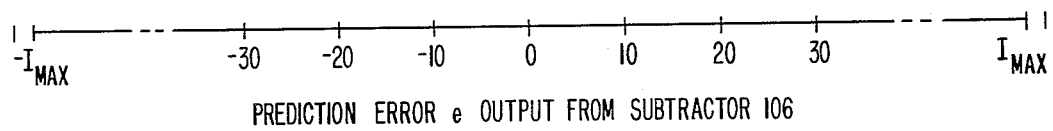
PREDICTION ERROR e OUTPUT FROM SUBTRACTOR 106

RECONSTRUCTION OF QUANTIZED DPCM OR PCM SIGNALS

BACKGROUND OF THE INVENTION

1. Field of the Invention

The present invention relates generally to reconstruction of signals that were encoded using pulse code modulation (PCM) or differential pulse code modulation (DPCM) techniques and, in particular, to reconstruction of such signals which have been quantized.

2. Description of the Prior Art

In most communication systems that employ any type of digital encoding (e.g., pulse code modulation (PCM) and differential pulse code modulation (DPCM) systems), samples of the signal being processed are quantized before being encoded and transmitted to the receiver. Quantizers in PCM encoders assign a particular one of 'N' representative values to each sample, depending upon which of a corresponding 'N' mutually exclusive quantization levels brackets that sample value. In a DPCM encoder, the quantizer assigns a representative value to the prediction error formed by subtracting a predicted version of each sample from its true value. To increase transmission efficiency, the representative values output from the quantizer are typically encoded with unique code words, such that more frequently occurring representative values are encoded with shorter words. At the receiver, each code word is decoded by assigning the appropriate representative value (hereafter sometimes referred to as "normal representative value") to the quantized quantity i.e., sample value in PCM or error value in DPCM. As stated previously, the normal representative value for each received code word is typically selected within the range defined by the upper and lower limits of the particular encoder quantization level into which the quantized quantity fell. The selection of quantizer representative values has traditionally been determined by considerations of minimum mean-square quantization error.

From the foregoing description, it is seen that in conventional PCM systems, no use is made of the spatial or temporal correlation of neighboring samples, either at the transmitter for coding, or at the receiver for reproduction. In DPCM systems, previously transmitted values are typically used for coding at the transmitter. However, little or no use of correlation has been made at the receiver for reproduction. This essentially "wastes" information available at the receiver and results in a larger reconstruction error. In addition, use has not been made of the fact that the range of quantizer input values defined by the upper and lower limits of the different quantizer levels is a known quantizer characteristic.

SUMMARY OF THE INVENTION

The present invention uses the correlation between the present PCM or DPCM quantized sample and its past (and, if desired, future) neighbors, the normal representative value, as well as information regarding the quantizer characteristics (i.e., the upper and lower limits of the different quantizer levels) for generating a more accurate reconstructed value, either at the receiver or at the transmitter. This in effect "reassigns" the normal representative value, based upon previously wasted information.

More specifically, the reconstructed value is determined by (1) selecting a set of samples which are temporally or spatially related to the present sample, (2) determining the range in which an "improved" reconstructed value of the present must lie, based upon knowledge of the quantizer characteristics, and (3) locating the improved reconstructed value within the range, as a function of reconstructed values of the present sample and the selected related samples, which were calculated using normal representative values.

The present invention can be used only at the receiver, to allow more accurate recovery of the original sample value with no additional information transmission. It can also be used at the transmitter in a DPCM encoding system to improve the reconstructed values of neighboring samples used in predicting the value of the present sample. The technique can reduce mean square reconstruction error, at the expense of somewhat increased processing and storage, the costs of which have been considerably reduced of late.

BRIEF DESCRIPTION OF THE DRAWING

The present invention will be more readily appreciated by reference to the following detailed description when read in light of the accompanying drawing in which:

FIG. 2 illustrates the locations of elements (pels) in a picture that may be processed by the apparatus of FIG. 1; and FIG. 3 illustrates one possible arrangement of quantization levels in the quantizer of FIG. 1.

DETAILED DESCRIPTION

Figure 1:
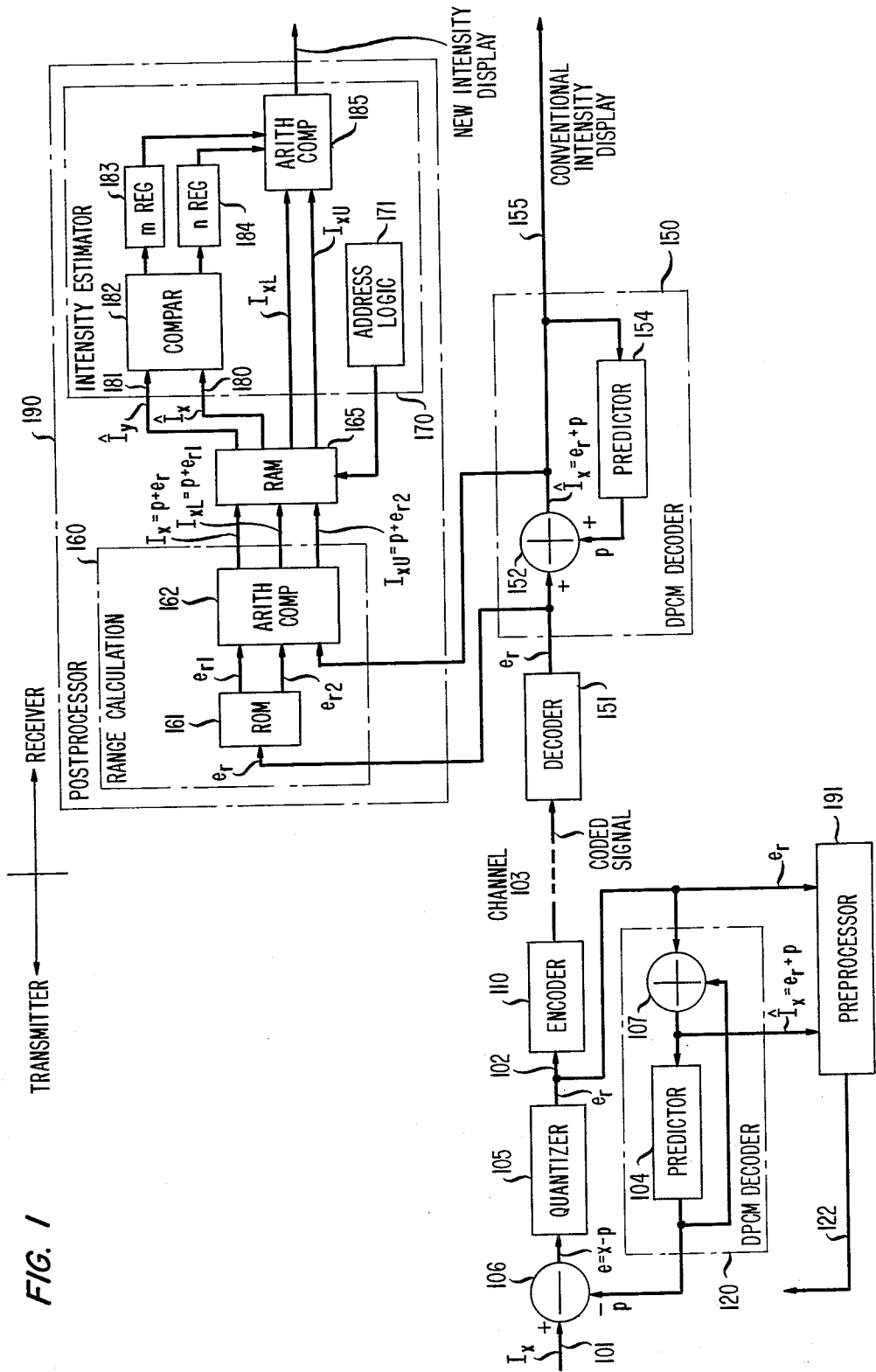
FIG. 1 is a block diagram of a conventional DPCM transmitter and a receiver constructed in accordance with the present invention to provide improved reconstruction of encoded samples.

The present invention will first be described as used in the receiver of a DPCM video transmission system, although it is to be understood that a PCM encoder/decoder could also be used, and that the present technique is applicable to other signals (such as speech) which exhibit high temporal or spatial correlation. In a basic DPCM system, as shown in FIG. 1, a prediction p of the value $I_X$ of the "present" sample applied on input line 101 is made in predictor 104 from previously reconstructed sample values. For this purpose, predictor 104 typically includes a memory or delay element and combinational logic, not shown but well known in the art. The input samples may be derived by scanning a picture (FIG. 2) along a series of generally parallel scan lines such as "previous" scan line 201, "present" scan line 202 and "next" line 203, and sampling the resulting intensity signal, so that each sample represents the intensity at a particular picture element (pel) location. Notationally, the intensity of presently processed pel (X) on line 202 is $I_X$, the intensity of the previous pel (A) is $I_A$, and so on.

Using one specific arrangement for predictor 104 the intensity $I_X$ of pel X may be predicted using the reconstructed intensity value $\hat{I}_A$ of the preceding picture element (A) on the same scan line. The hat symbol " ^ " denotes that an intensity value has been reconstructed from a previously quantized value, and thus will include quantization error. The predictor output is combined with the next error value output from quantizer 105 to form the reconstructed value $\hat{I}_X$ for pel (X), which is input to predictor 104. Predictor 104 may alternatively be arranged to average the reconstructed values of pels $\hat{I}_A$ and $\hat{I}_D$ on the present and previous scan lines, respectively, to obtain the prediction for $I_X$, or other combinations of pels A, B, C and D which have already been processed may be used to form the prediction.

In any event, a prediction error value e is obtained in subtractor 106 by forming the difference between the predicted value p output from predictor 104 and the actual intensity value $I_X$ of pel X. The error value is then quantized by a quantizer 105 which determines into which one of a set of mutually exclusive discrete amplitude levels the error value falls. Quantizer 105 generates a representative value $e_r$ for each of the quantized levels, and encoder 110 is arranged to generate a unique code word indicative of each representative level. Thus, if so-called "previous element" prediction is used, the code word generated in encoder 110 represents the quantized value $I_X - \hat{I}_A$. If other predictors are used, the code represents the quantized difference between $I_X$ and p, the predicted value output from predictor 104. Code words which represent different quantizer representative values are typically binary words of either fixed or variable length, with shorter words representing more frequently occurring values.

Quantizer 105 can be better understood by reference to FIG. 3. As shown therein, the prediction error value "e" output from subtractor 106 may fall within one of a series of N mutually exclusive levels such as levels $e_1$, $e_2$, $e_3$ and $e_4$. Each level includes a range of error values having a lower limit $e_{rL}$ and an upper limit $e_{rU}$; thus level $e_1$ includes values between $e_{1L}$ and $e_{1U}$ while level 302 includes values between $e_{2L}$ and $e_{2U}$. Generally, if each pel can have an intensity value between 0 and $I_{max}$, then the error e may have a value between $-I_{max}$ and $+I_{max}$. For each of the different quantizer levels, quantizer 105 produces a unique representative value $e_r$. For example, the representative value for level $e_1$ is $e_{r1}$, the representative value for level $e_2$ is $e_{r2}$, and so on. Encoder 110 is arranged to provide a code word which is recognized at the receiver as being associated with a particular representative value.

The receiver portion of the DPCM system of FIG. 1 includes a decoder 151, a conventional DPCM decoder 150 as well as additional processing circuitry for deriving an improved reconstructed version of the original signal in accordance with the present invention. Decoder 151 is arranged to recognize each incoming code word and generates the corresponding normal representative value $e_r$ which is applied to one input of adder 152 within DPCM decoder 150. The second adder input is derived from a predictor 154 which corresponds to predictor 104 in the transmitter portion of the system and which produces a prediction p of each incoming sample based upon previously processed samples. The output of adder 152 is the reconstructed value $\hat{I}_X = p + e_r$ of the original input sample.

The operation thus far described is conventional, and may be summarized by an example assuming previous element prediction. Thus, when the intensity of the present pel X is applied on input line 101, its predicted value is $\hat{I}_A$ (the reconstructed value of the previous pel) and the error value e applied at the input of quantizer 105 is $I_X - \hat{I}_A$. If this value is within level $e_1$ in FIG. 3, the quantizer output is $e_{r1}$, and a code word indicative of that value is coded by encoder 110 and applied to channel 103. The error value $e_{r1}$ is also combined in adder 107 with the output of predictor 104 to yield the reconstructed value $\hat{I}_X$ of the present sample, which is used to predict the value of the next sample corresponding to pel F.

At the receiver, the incoming code word is interpreted as being associated with representative value $e_{r1}$, and that value is applied to one input of adder 152, the other input of which the predicted value p, which in this example is $\hat{I}_A$, the reconstructed value of the previous sample. The adder output $\hat{I}_X = e_{r1} + \hat{I}_A$ is the conventional reconstructed value of the present sample, and is made available on line 155 as well as being applied to predictor 154 for use in processing subsequent samples.

The present invention takes advantage of the fact that the output $e_r$ from decoder 151 implicitly carries with it information that the error value e quantized in the transmitter was within a particular quantizer level, and that $e_r$ can thus have a value in the range between $e_{rL}$ and $e_{rU}$ determined by the quantizer characteristics. This means that the reconstructed value $\hat{I}_X$ must lie in the range between $(p + e_{rL})$ and $(p + e_{rU})$. It also takes advantage of the fact that information as to an appropriate position within this range can be determined from previously processed samples spatially or temporally related to the present pel, such as pels A-D. Furthermore, by including suitable delay in RAM 165 (described below) information regarding subsequently processed samples F-I can also be used.

One specific technique for computing an improved reconstructed intensity value $\hat{I}_X'$ for pel X in accordance with the present invention is as follows:

(1) A set of picture elements such as pels A-D and F-I in FIG. 2 which neighbor the presently processed element X is selected.

(2) The range in which the improved reconstructed value must lie, namely between $(p + e_{rL})$ and $(p + e_{rU})$ is determined from knowledge of the encoder quantizer characteristics.

(3) The improved reconstructed value for pel X is then assigned within the range, as a function of the normal reconstructed values for pel X and the surrounding pels A-D and F-I, (as computed in the conventional DPCM receiver 150 of FIG. 3).

The actual assignment of $\hat{I}_X$ within the range can be determined by defining variables n and m as the number of surrounding picture elements having normal reconstructed values less than and more than the normal reconstructed value $(p + e_r)$ of pel X, respectively. Then, the new reconstructed value $\hat{I}_X'$ for pel X is computed as $$\hat{I}_X' = \frac{n(p + e_1) + m(p + e_r)}{(n + m)} \quad \text{if } n > m \quad (1)$$

$$= \frac{n(p + e_r) + m(p + e_2)}{(n + m)} \quad \text{if } n < m$$

$$= p + (e_1 + e_2)/2 \quad \text{if } n = m.$$

From Equation (1), it is seen that the reconstructed value $\hat{I}_X'$ is a weighted average calculated using at least one of the endpoints of the range $(p + e_{rL})$ to $(p + e_{rU})$ of the quantizer level which brackets the normal reconstructed value $(p + e_r)$. The weights are determined by the values of m and n, which are derived from the relationship of the surrounding picture elements to $(p + e_r)$. Since the improved reconstructed value is assured to be within the range $(p + e_1)$ to $(p + e_2)$, the filtering action performed by Equation (1) does not blur picture edges significantly. If desired, it is possible to select a subset of the surrounding picture elements which have characteristics similar to pel X in computation of n and m, to insure that the averaging does not produce any noticeable artifact.

If the values of n and m are close, and the values change only slightly from sample to sample, the reconstruction derived using Equation (1) may show jumps from sample to sample. This provides a dithering effect that may in fact improve picture quality. However, other reconstruction weighting strategies that do not result in such sudden jumps can be used, in lieu of the relationship of Equation (1). For example, the reconstructed intensity value $\hat{I}_{X}'$ may be computed as in Equations (2) or (3) below:

$$\hat{I}_X = p + e_r + \frac{n-m}{2(n+m)}(e_1 - e_2) \qquad (2)$$

or $$\hat{I}_X = p + \frac{n}{n+m}e_1 + \frac{m}{n+m}e_2. \qquad (3)$$

The improved reconstructed value specified in Equation (1) is generated within a postprocessor designated generally at 190 by first applying the decoded normal representative value $e_r$ (output from decoder 151) and the reconstructed intensity value $\hat{I}_X = p + e_r$ to a range calculation circuit 160 which includes a read-only memory (ROM) 161 and an arithmetic computation circuit 162. ROM 161 acts as a simple look-up table, and outputs the lower and upper limits $e_{rL}$ and $e_{rU}$ of the quantizing level which includes $e_r$ as its normal representative level. Arithmetic computation circuit 162 can then easily compute, for each pel, the upper and lower limits of $\hat{I}_{X}'$, namely, $(p+e_{rL})$ and $(p+e_{rU})$ and store these values along with $\hat{I}_X = p + e_r$ in a random access memory 165.

When the reconstructed intensity values for selected surrounding pels have been entered in RAM 165, intensity estimator 170 computes the improved reconstructed value in accordance with Equation (1), or alternatively, Equations (2) or (3). Address logic 171 is arranged to obtain from RAM 165 the reconstructed intensity value $\hat{I}_X$ for the presently processed pel (line 180) and the reconstructed value (such as $\hat{I}_A$) for each of the selected series of surrounding pels (line 181). The values are compared in comparator 182, and used to advance m register 183 or n register 184, depending on whether the reconstructed value of the neighboring pel exceeds $\hat{I}_X$. When all selected neighboring pels have been processed, the contents of registers 183 and 184 are applied to arithmetic computation circuit 185, which receives the values of $(p+e_{rL})$ and $(p+e_{rU})$ from RAM 165 and computes $\hat{I}_{X}'$ in accordance with Equation (1). Registers 183 and 184 and address logic 171 are then cleared for the next computation cycle.

Computer simulations performed to evaluate the present invention used two still frames each of which included an array of 256×256 pels each having an intensity value represented by an 8-bit word. Two predictors, A (previous elements), A+(D/2) (Planar, two dimensional) were used in combination with three symmetric, even level quantizers $Q_1$, $Q_2$ and $Q_3$. The positive decision levels for the quantizers were:

$Q_1$: 0, 10, 255 (4 levels)
$Q_2$: 0, 3, 9, 29, 255 (8 levels)
$Q_3$: 0, 10, 25, 43, 255 (8 levels)

The mean absolute reconstruction error (i.e., the magnitude of the difference between the original and the reconstructed intensity value) was calculated for both pictures using both conventional DPCM and the improved reconstruction technique of the present invention. Three cases were considered, depending on the number of neighboring pels used. Case 1 used two neighbors, A, and F (FIG. 2); Case 2 used four neighbors, A, F, C, H; and Case 3 used all eight neighbors, A-D and F-I. The table below shows the mean absolute reconstruction error for the various cases.

TABLE 1

| | | NUMBER OF NEIGHBORS = 2 | | NUMBER OF NEIGHBORS = 4 PREDICTOR USED | | NUMBER OF NEIGHBORS = 8 | |
|---|---|---|---|---|---|---|---|
| | | A | $\frac{A+D}{2}$ | A | $\frac{A+D}{2}$ | A | $\frac{A+D}{2}$ |
| QUANTIZER USED: $Q_1$ | STANDARD DPCM | 5.77 | 4.81 | 5.77 | 4.81 | 5.77 | 4.81 |
| | IMPROVED DPCM | 5.84 | 4.92 | 5.07 | 4.08 | 4.87 | 3.94 |
| QUANTIZER USED: $Q_2$ | STANDARD DPCM | 3.13 | 2.31 | 3.13 | 2.31 | 3.13 | 2.31 |
| | IMPROVED DPCM | 3.18 | 2.72 | 3.07 | 2.45 | 3.01 | 2.40 |
| QUANTIZER USED: $Q_3$ | STANDARD DPCM | 2.92 | 3.09 | 2.92 | 3.09 | 2.92 | 3.09 |
| | IMPROVED DPCM | 2.95 | 3.01 | 2.35 | 2.20 | 2.07 | 2.08 |

It is noted that use of information derived from a larger number of neighboring pels improves the performance of the postprocessing technique of the present invention. Larger improvements in mean absolute error are obtained for quantizers that have coarse inner levels. Thus, when quantizers $Q_1$ or $Q_3$ were used, we obtained about 20 percent improvement over the standard DPCM. Although the mean absolute error does not show improvement with quantizer $Q_2$, the subjective quality of the picture was improved considerably, due to improved reconstruction of the low contrast areas as well as edges.

It is noted that quantizers for intraframe predictive coders usually contain fine inner levels to reduce the visible granular noise in flat areas. However, if only a small number of levels can be used, then one has to trade off granular noise for other distortions such as edge busyness. The present invention enables use of a quantizer with coarse inner levels so that better edge reproduction is possible, since granular noise would be mitigated to a large extent.

While the technique described above relates to post-processing at a receiver to obtain better reconstruction, it is also possible to use the technique for preprocessing at a transmitter which includes a DPCM encoder. This is because, in DPCM systems, reconstructed values used for prediction are processed in circuitry (within box 120) identical to the DPCM decoder 150 found in the receiver. It is therefore possible to use a preprocessor 191 (identical to postprocessor 190) to derive an improved reconstruction for each sample and then use this improved reconstructed value (on line 192) for prediction in lieu of the output of predictor 104. However, only previously transmitted value can be used for improved reconstruction at the transmitter. Thus, for an intraframe predictor, information derived from pels A-D can be used. If a frame memory is provided to allow processing of pels in the previous frame (e.g., pels F, G and H), then even more substantial improvement is possible.

Various modifications and adaptations of the present invention may be made by those skilled in the art. For this reason, it is intended that the invention be limited only by the appended claims. For example, as stated previously, while the processing of a DPCM encoded video signal was described as an example, the present invention could be used with an audio, video or other temporal or spatially correlated signal processed using PCM or DPCM techniques. The invention can be implemented in general purpose hardware under software control or numerous other hardware arrangements which will be well known to those skilled in the art.

What is claimed is:

1. A method of reconstructing the value of samples of a correlated signal which have been quantized, said quantized samples each having a representative value associated with one of a predefined set of mutually exclusive quantization levels having upper and lower limits, characterized by determining a range for said reconstructed value of a present sample, based upon said upper and lower limits of said quantizer level associated with said representative value for said present sample, and assigning said reconstructed value within said range as a function of reconstructed values of samples spatially or temporally correlated with said present sample.

2. The method defined in claim 1 wherein said quantized samples each represent the intensity value of an element (pel) of a picture, and said assigning step includes storing reconstructed intensity values of pels in a neighborhood surrounding the picture element to which said present sample corresponds.

3. The method defined in claim 2 wherein said assigning step includes:
   (a) determining a normal reconstructed value for said present sample using said representative value,
   (b) determining the number (n and m) of said stored reconstructed values which are respectively less than and more than said normal reconstructed value, and
   (c) computing said reconstructed value as a function of n and m.

4. The method defined in claim 3 wherein said computing step includes:
   (d) forming a weighted average of an endpoint of said range and said normal reconstructed value using the values of n and m for weighting.

5. The method defined in claim 3 wherein said computing step includes selecting said reconstructed value $I_X'$ such that $$\hat{I}_X = \frac{n(p + e_1) + m(p + e_r)}{(n + m)} \quad \text{if } n > m$$

$$= \frac{n(p + e_r) + m(p + e_2)}{(n + m)} \quad \text{if } n < m$$

$$= p + (e_1 + e_2)/2 \quad \text{if } n = m$$

where $(p+e_r)$ is said normal reconstructed value, and $(p+e_1)$ and $(p+e_2)$ are the endpoints of said range.

6. A method of increasing the accuracy with which the value of each of a series of quantized samples is reconstructed, each quantized sample having an original value within one of a predefined set of mutually exclusive quantization levels, each level having upper and lower limits and an associated representative value, characterized by the steps of:
   (a) determining a range of possible reconstructed values for a present sample, based upon said upper and lower limits of said quantizer level associated with said representative value for said present sample, and
   (b) assigning said reconstructed value within said range as a function of reconstructed values for other ones of said samples.

7. The method defined in claim 6 wherein said present quantized sample represents the intensity value of a particular element (pel) of a picture and said other ones of said samples represent intensity values of pels which surround said particular pel.

8. The method defined in claim 6 wherein said present quantized sample represents the prediction error value for a particular element (pel) of a picture formed by subtracting the predicted intensity value of said pel from the true value thereof, and said other ones of said samples represent pels which surround said particular pel.

9. The method defined in claims 7 or 8 wherein said assigning step includes:
   (1) determining the numbers (n and m) of said surrounding pels having reconstructed values which are respectively more than and less than the normal reconstucted value of said present quantized sample calculated using said representative value, and
   (2) weighting the average of an endpoint of said range and said normal reconstructed value as a function of n and m.

10. The method defined in claim 9 wherein said weighting step includes:
    (a) weighting the lower endpoint of said range by n and weighting said normal reconstructed value by m, if n is greater than m, or
    (b) weighting the upper endpoint of said range by m and weighting said normal reconstructed value by n, if n is less than m.

11. A method of reconstructing the value of a present sample of a signal, said present sample having an associated prediction error value e formed from the difference between the original value $I_X$ of said sample and a prediction p thereof, said error value having a quantized representative value $e_r$ associated with one of a predefined set of mutually exclusive quantization levels having upper and lower limits $e_{rU}$ and $e_{rL}$, respectively, including the steps of:

defining a range $(e_{rL}+p)$ to $(e_{rU}+p)$ for said reconstructed value of said present sample, based upon said upper and lower limits of said quantizer level associated with said normal representative value for said present sample, and assigning said reconstructed value within said defined range as a function of reconstructed values for previously processed samples.

12. The method defined in claim 11 wherein said assigning step includes selecting said previously processed samples based on their correlation with said present sample.

13. The method of claim 12 wherein said assigning step further includes:
   (a) determining the numbers m and n of said selected samples having values near the upper and lower ends of said range, respectively, and
   (b) weighting an average formed using at least one of the endpoints of said range with m and n.

14. A method of reconstructing the value of quantized DPCM samples each representing the difference between the intensity value of an element (pel) of a picture and a predicted version thereof, said quantized samples each having a representative value associated with one of a predetermined set of mutually exclusive quantization levels, said representative value being intermediate upper and lower limits of the associated quantization level, including the steps of:
   (a) storing reconstructed intensity values for pels neighboring the present pel for which an intensity value is being reconstructed,
   (b) determining the numbers n and m of said stored values which are respectively less than and more than the reconstructed value of said present pel calculated using said representative value, and
   (c) calculating said reconstructed value as a joint function of m and n and said upper and lower limits of the quantization level with which said representative value is associated.

15. Apparatus for reconstructing the value of samples of a correlated signal which have been quantized, said quantized samples each having a representative value associated with one of a predefined set of mutually exclusive qwuantization levels having upper and lower limits, characterized by
   means for determining a range for said reconstructed value of a present sample, based upon said upper and lower limits of said quantizer level associated with said representative value for said present sample, and
   means for assigning said reconstructed value within said range as a function of reconstructed values of samples spatially or temporally correlated with said present sample.

16. The invention defined in claim 15 wherein said quantized samples each represent the intensity value of an element (pel) of a picture, and said assigning means includes means for storing reconstructed intensity values of pels in a neighborhood surrounding the picture element to which said present sample corresponds.

17. The invention defined in claim 16 wherein said assigning means includes:
   (a) means for determining a normal reconstructed value for said present sample using said representative value,
   (b) means for determining the number (n and m) of said stored reconstructed values which are respectively less than and more than said normal reconstructed value, and
   (c) means for computing said reconstructed value as a function of n and m.

18. The invention defined in claim 17 wherein said computing means includes:
   (d) means for forming a weighted average of an endpoint of said range and said normal reconstructed value using the values of n and m for weighting.

19. The invention defined in claim 17 wherein said computing means includes means for selecting said reconstructed value $I_X'$ such that $$\hat{I}_X = \frac{n(p+e_1) + m(p+e_r)}{(n+m)} \quad \text{if } n > m$$
$$= \frac{n(p+e_r) + m(p+e_2)}{(n+m)} \quad \text{if } n < m$$
$$= p + (e_1 + e_2)/2 \quad \text{if } n = m$$

where $(p+e_r)$ is said normal reconstructed value, and $(p+e_1)$ and $(p+e_2)$ are the endpoints of said range.

20. Apparatus for increasing the accuracy with which the value of each of a series of quantized samples is reconstructed, each quantized sample having an original value within one of a predefined set of mutually exclusive quantization levels, each level having upper and lower limits and an associated representative value, characterized by:
   (a) means for determining a range of possible reconstructed values for a present sample, based upon said upper and lower limits of said quantizer level associated with said representative value for said present sample, and
   (b) means for assigning said reconstructed value within said range as a function of reconstructed values for other ones of said samples.

21. The invention defined in claim 20 wherein said present quantized sample represents the intensity value of a particular element (pel) of a picture and said other ones of said samples represent intensity values of pels which surround said particular pel.

22. The invention defined in claim 20 wherein said present quantized sample represents the prediction error value for a particular element (pel) of a picture formed by subtracting the predicted intensity value of said pel from the true value thereof, and said other ones of said samples represent pels which surround said particular pel.

23. The invention defined in claims 21 or 22 wherein said assigning means includes:
   (1) means for determining the numbers (n and m) of said surrounding pels having reconstructed values which are respectively more than and less than the normal reconstructed value of said present quantized sample calculated using said representative value, and
   (2) means for weighting the average of an endpoint of said range and said normal reconstructed value as a function of n and m.

24. The invention defined in claim 23 wherein said weighting means is arranged to weight the lower endpoint of said range by n and weight said normal reconstructed value by m, if n is greater than m, or
   weight the upper endpoint of said range by m and weight said normal reconstructed value by n, if n is less than m.

25. Apparatus for reconstructing the value of a present sample of a signal, said present sample having an associated prediction error value e formed from the difference between the original value $I_X$ of said sample and a prediction p thereof, said error value having a quantized representative value $e_r$ associated with one of a predefined set of mutually exclusive quantization levels having upper and lower limits $e_{rU}$ and $e_{rL}$, respectively, including:

means for defining a range $(e_{rL}+p)$ to $(e_{rU}+p)$ for said reconstructed value of said present sample, based upon said upper and lower limits of said quantizer level associated with said normal representative value for said present sample, and means for assigning said reconstructed value within said defined range as a function of reconstructed values for previously processed samples.

26. The invention defined in claim 25 wherein said assigning means is arranged to select said previously processed samples based on their correlation with said present sample.

27. The invention of claim 26 wherein said assigning means includes:

(a) means for determining the numbers m and n of said selected samples having values near the upper and lower ends of said range, respectively, and (b) means for weighting an average formed using at least one of the endpoints of said range with m and n.

28. Apparatus for reconstructing the value of quantized DPCM samples each representing the difference between the intensity value of an element (pel) of a picture and a predicted version thereof, said quantized samples each having a representative value associated with one of a predetermined set of mutually exclusive quantization levels, said representative value being intermediate upper and lower limits of the associated quantization level, including:

(a) means for storing reconstructed intensity values for pels neighboring the present pel for which an intensity value is being reconstructed, (b) means for determining the numbers n and m of said stored values which are respectively less than and more than the reconstructed value of said present pel calculated using said representative value, and (c) means for calculating said reconstructed value as a joint function of m and n and said upper and lower limits of the quantization level with which said representative value is associated.

* * * * *